A. SCHICK.
DETACHABLE RIM FOR VEHICLE WHEELS.
APPLICATION FILED AUG. 27, 1912.
1,076,238. Patented Oct. 21, 1913.
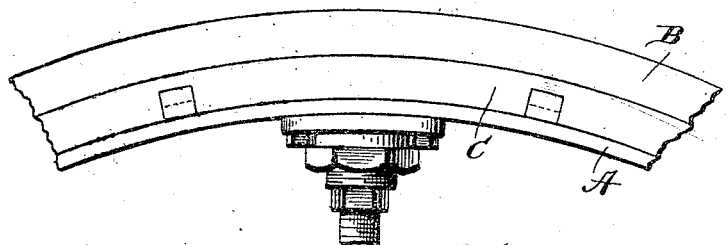
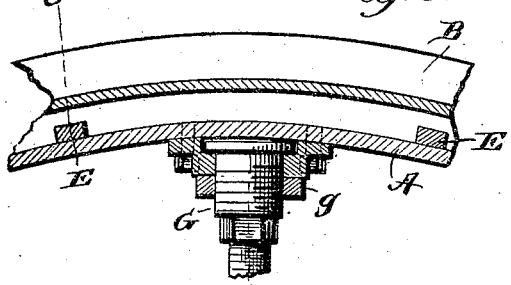
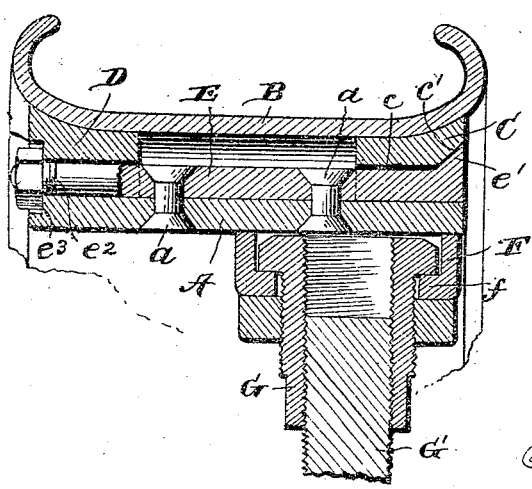
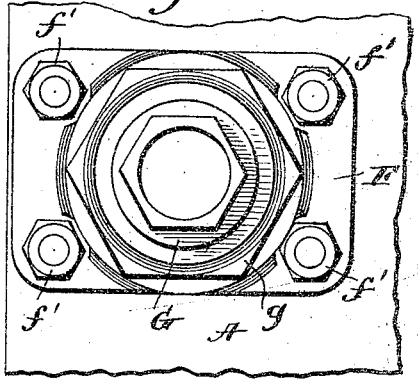
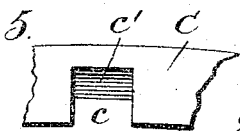
Witnesses:
Jas. E. Hutchinson
Gertrude Wedemeyer
Inventor:
Adolph Schick,
By Bacon & Milans, Attorneys

UNITED STATES PATENT OFFICE.

ADOLPH SCHICK, OF WHEELING, WEST VIRGINIA, ASSIGNOR TO SCHICK WHEEL AND TIRE CO., A CORPORATION OF WEST VIRGINIA.

DETACHABLE RIM FOR VEHICLE-WHEELS.

1,076,238.  Specification of Letters Patent. Patented Oct. 21, 1913.

Application filed August 27, 1912. Serial No. 717,399.

*To all whom it may concern:*

Be it known that I, ADOLPH SCHICK, a citizen of the United States, residing at Wheeling, in the county of Ohio and State of West Virginia, have invented certain new and useful Improvements in Detachable Rims for Vehicle-Wheels, of which the following is a specification, reference being had therein to the accompanying drawing.

This invention relates to an improvement in detachable rims for vehicle wheels and the same is embodied in the construction presently to be described.

The invention is designed more particularly as a rim for what may be termed or characterized as a "spring wheel," but its useful application is not necessarily limited to that particular type of wheel.

The object of the invention is to provide an economical structure embodying features whereby the tire holding rim can be placed and removed with but little trouble.

A further object of the invention is to provide a structure to be economical, that is, produced at a minimum cost, while maintaining the necessary rigid characteristic required in wheel rims.

In the accompanying drawings is shown an embodiment of the invention, wherein—

Figure 1 is a side elevation of a section of the rim, Fig. 2 is a similar view shown in longitudinal section, Fig. 3 is a cross section on the line 3—3 of Fig. 1, Fig. 4 is a bottom plan of a portion of the rim showing the nipple socket, and Fig. 5 is a detail view.

In the drawing, A represents a fixed metallic rim member serving in effect as a felly for the wheel, and B designates the rim for receiving the resilient tire. The rim B is removably supported on the fixed rim A in the following manner: As is common in this type of wheel, the rim B is curved, having its edges of hooked formation. Fashioned with its upper edge to conform to the curvature of the outer portions of the rim B, is a continuous locking ring C. This ring is provided at suitable intervals with notches $c$ and tooth receiving portions $c'$. Conveniently, the ring C is of a sufficient lateral thickness to fit well under the tire rim B. On the opposite side of the rim B is the ring D, which is constructed substantially like that of ring C, with the exception that the inclined seats $c'$ are omitted, and in lieu thereof counter sinks or depressions $d$ are formed at intervals in its outer face.

On the fixed rim A are positioned a series of locking bolts E. These bolts are conveniently flat throughout their body portion and are riveted or otherwise fixedly secured to the fixed rim A, the rivets being shown at $a$, Fig. 3. The length of the bolts E are co-extensive with that of the rim A and the extreme end conveniently at the right of each bolt is formed with an upstanding inclined tooth $e'$ fashioned to fit closely the inclined part $c'$ of the ring C. The opposite end of the bolt E has a threaded extension $e^2$, on which may be applied lock nut $e^3$. The bolt being of substantially rectangular cross section, corresponds in that particular with the channels or recesses formed in the inner faces of the rings C and D; so that there is a relatively close fit. In assembling the parts, the ring C is first slipped over the rim A, the walls of the recesses $c$ embracing the sides of the bolts E, then is forced well over until the tooth $e'$ enters the inclined recess $c'$ and thereafter the rim B is slipped on until it contacts properly with the ring C. After the rim B has been properly positioned, the ring D is slipped onto the fixed rim, the walls of the recesses of the ring D closely embracing the sides of the bolt. The nuts $e^3$ are then placed on the ends of the bolt E and the parts are drawn close together, thus locking the rim B to the rim A positively in all directions. The bolts E serve to preserve a proper lateral position of the rim B, as well as to render impossible relative creeping movement between the two parts.

One of the advantages of the above described construction is that the rim A may be of commercial stock, as well as the rim B. The bolts can be made very cheaply and attached to the fixed rim at such points as may be required. The rings C and D being continuous, render the connection exceedingly strong and serve to constitute effective supports for the rim B and tire. It is desirable that the rings C and D shall engage or rest close against the outer face of the rim A.

One of the further advantages of the above construction is that of its adaptability for receiving a spoke nipple, which will now be described. Arranged conveniently in staggered relation on the inner side of the rim A are a series of recessed plates F (but one being shown) which are of somewhat oblong formation. These plates have centrally arranged a depressed part having inturned flanges as at $f$. The ends of the plates are perforated and are secured to the rim A by suitable bolts $f'$ having their inner ends seated in counter sinks in the rim A. A chamber formed by the depressed part is designed to receive the head of the nipple G, which nipple is provided with internal screw threads with which the threaded end of the spokes G' engage. A lock nut $g$ is threaded on the outer face of the nipple bearing against the flange $f$ and thus drawing the head of the nipple close onto the flange and locking the parts in position. The lower end of the nipple is conveniently provided with a wrench hold as shown. I have found that by arranging the nipple seat on the inner face of the fixed rim in the manner above described, a very economical method of attaching the nipples to the spoke of the rim is provided. The nipple seats can, as will be readily understood, be very cheaply made by stamping out of metal and the parts can be assembled with but little skill and a minimum amount of labor.

I desire it understood that modifications of the above construction can be made and substituted for those shown without departing from the nature and principle of the invention.

Having thus described the invention, what is claimed as new and desired to be secured by Letters Patent is:

1. In a detachable rim for wheels, the combination with a fixed rim member, of a series of independently formed bolt members rigidly secured to the same at intervals, each bolt member having a locking tooth at one end, and a threaded stem at the opposite end, a rim member E, a ring interposed between the fixed rim and the rim B and having notches shaped to engage with said tooth and to embrace the bolt, a complementary oppositely disposed ring member having notches to embrace the bolt and nuts for forcing the said ring inward, and for maintaining the parts in position.

2. In a detachable rim for vehicle wheels, the combination with a metallic fixed rim, of substantially uniform thickness, a series of independently formed bolt members fitted on the outer face of the same, means for rigidly connecting the bolt members to the fixed rim, said bolt members having inclined engaging portions at one end and threaded portions at the opposite end, a rim member B, a ring having notches in which the bolt member fits and having parts for engaging said projection on the bolt member, a complementary ring member positioned and embracing the bolt member at intervals, and nuts on the bolt members for securing the parts in position.

3. In a detachable rim for wheels, the combination with a fixed rim part, of a series of transversely arranged bolts secured to the fixed rim and having at one end outstanding inclined portions and threaded opposite ends, of a rim member B, a ring member having notches in which the bolt members are fitted and having inclines engaging the inclines of said bolt members, a complementary ring having notches in which the opposite ends of the bolt members engage and nuts on the bolts for securing the parts together.

In testimony whereof I affix my signature in presence of two witnesses.

ADOLPH SCHICK.

Witnesses:
CALVIN T. MILANS,
PRESTON BACON.

---

Copies of this patent may be obtained for five cents each, by addressing the "Commissioner of Patents, Washington, D. C."